United States Patent Office 3,454,667
Patented July 8, 1969

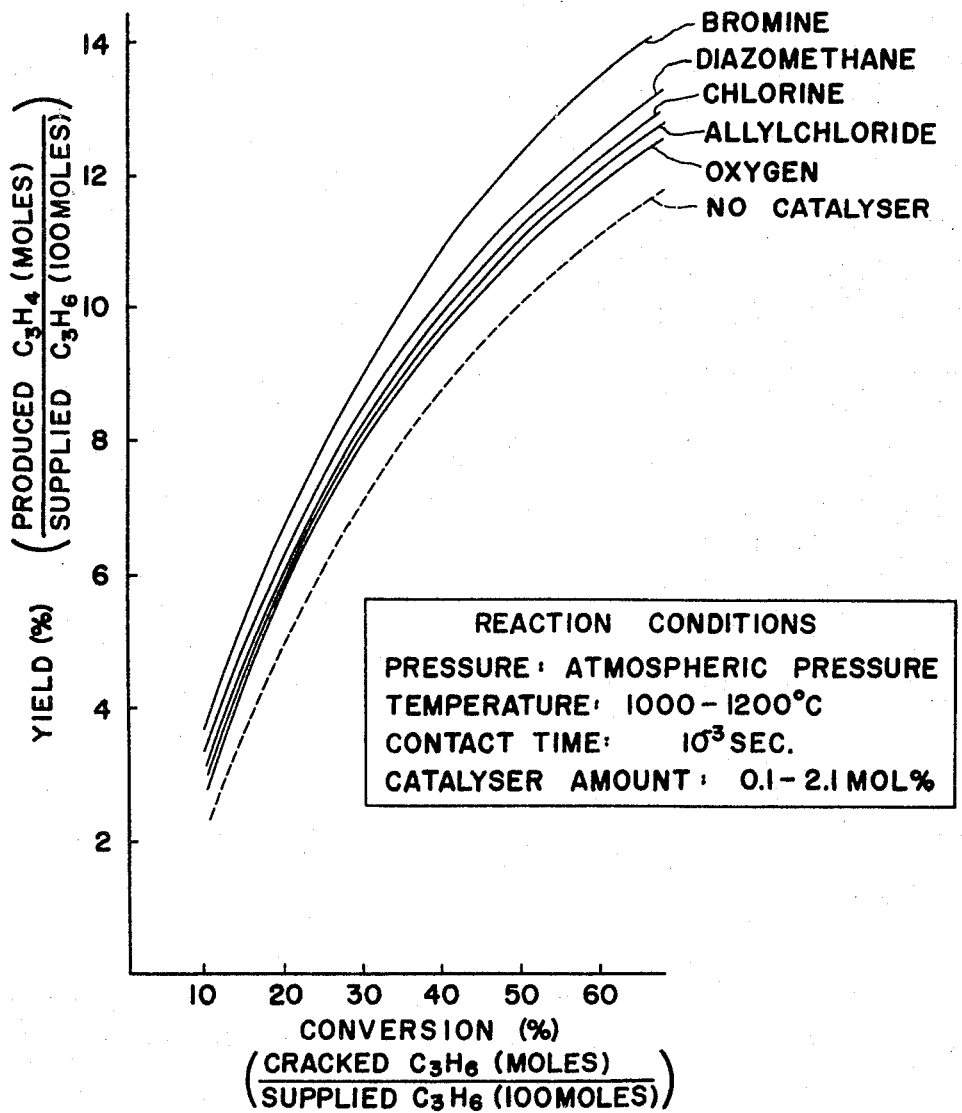

3,454,667
METHOD OF PRODUCING METHYL ACETYLENE
AND ALLENE FROM PROPYLENE
Sango Kunichika, Yasumasa Sakakibara, and Mamoru Taniuchi, Takatsuki-shi, Japan, assignors to Chiyoda Kako Kensetsu Kabushiki Kaisha, Tokyo, Japan, a Japanese corporation
Filed July 7, 1966, Ser. No. 563,587
Claims priority, application Japan, July 23, 1965, 40/44,668
Int. Cl. C07c *11/14, 11/22*
U.S. Cl. 260—678                8 Claims

ABSTRACT OF THE DISCLOSURE

In the pyrolysis of propylene to form methyl acetylene and allene the improvement comprising conducting said pyrolysis in the presence of at least one catalyst which consists essentially of a compound selected from the group consisting of oxygen, chlorine, bromine, diazomethane and allyl chloride.

---

This invention relates to a method of producing methyl acetylene and allene by pyrolysis of propylene. More particularly, the invention relates to a method of producing methyl acetylene and allene from propylene by adding a radical-donating substance such as oxygen, chlorine, bromine, diazomethane, and allyl chloride (hereinafter referred to as catalysts) which facilitates the hydrogen-abstraction reaction in pyrolysis of propylene, to the material gas.

It has been known that, in the same manner as in the manufacture of acrylate from acetylene by the so-called Reppe reaction, methyl acetylene reacts with carbon monoxide and alcohol to give methacrylate. (The literature on this subject includes: J. W. Copenhaver, "Acetylene and Carbon Monoxide Chemistry," Reinhold Publishing Corp., New York (1949), p. 299; A. Ya. Yakubovich, E. V. Kolkova, "Doklady Akad. Nauk S.S.S.R.," 84, 1183 (1952); British Patent No. 887,433 (1962) and Y. Sakakibara, Bull. Chem. Soc., Japan, 37, 1601 (1964).)

The method of manufacturing methyl methacrylate by Reppe reaction of methyl acetylene has attracted the attention in the art as a new synthesis method which can take the place of the acetone cyanohydrin process currently in use. At present, however, its industrial significance is gravely doubted because the starting material, methyl acetylene, can be obtained secondarily in the manufacture of acetylene only in a negligible amount, say about 0.5% of the total product.

Meanwhile, the known method for the manufacture of methyl acetylene depends on the pyrolysis of isobutylene. The present inventors conceived of producing methyl acetylene through a direct dehydrogenation reaction of propylene which is produced in a far greater amount than isobutylene, and have studied the possibility since 1959. A part of the results has already been disclosed in the literature (Y. Sakakibara; Bull. Chem. Soc., Japan, 37, 1262 (1964)). In this article, one of the present inventors reported that methyl acetylene and allene were obtained at high yields by the pyrolysis of propylene containing about 20 mol. percent of nitrogen, at a temperature of 1200–1300° C. and under a pressure of not more than 100 mm. Hg for a contact time of about $10^{-3}$ second.

Also, there have been published four patented inventions pertaining to this subject.

According to one of such patents, i.e. Hogsed's U.S. Patent No. 2,925,451 (1960), isobutylene or propylene is is converted into methyl acetylene and allene by passing through the filaments of highly resistant metal such as platinum or Nichrome kept at a temperature of not less than 900° C., under a reduced pressure of not more than 100 mm. Hg for a contact time of not more than 0.01 second. The disadvantages of the method in its industrial application are the difficulties involved in maintaining such a reduced pressure at the elevated temperature and in providing such metal filaments. Happel et al. disclosed in Belgian Patent No. 6,121,415 (1962) (corresponding to Canadian Patent No. 703,132 (1965)) that it is advantageous over Hogsed's method to effect the pyrolysis of propylene in the presence of a large amount (34–93 mol. percent) of steam under a normal pressure rather under a reduced pressure. This method takes place at a temperature of 950–1200° C. for a contact time of not more than 0.05 second. The method of pyrolyzing propylene diluted with steam gives better yields of methyl acetylene and allene than by the pyrolysis of the starting material diluted with nitrogen, but the yield is almost the same as that obtained in the reduced pressure process.

More recently, Happel et al. point out in French Patent No. 1,389,102 (1965) that the yield can be remarkably increased by pyrolyzing isobutylene or propylene through dilution with steam and, moreover, in the presence of hydrogen bromide or compounds which produced hydrogen bromide. According to this method, the amount of hydrogen bromide to be added is a molar ratio of hydrogen bromide to propylene in the range of 1/15 to 1/1, and the yield increases proportionally with the amount of hydrogen bromide. Thus, in order to attain a satisfactory yield a very large amount of hydrogen bromide is required and this causes the material of apparatus to corrode in the industrial application.

In the meantime, one of the present inventors also disclosed that the dehydrogenation of propylene whereby methyl acetylene and allene are prepared is a chain reaction of free radicals. (Y. Sakakibara; Bull. Chem. Soc., Japan 37, 1268 (1964).)

First, the prior art throught that the formation of allyl radical by the hydrogen-abstraction reaction of proplene represents a chain initiation reaction,

$$CH_2=CH-CH_3 \rightarrow CH_2=CH-CH_2 \cdot + H$$

and presumed that the primary product of the reaction is therefore allene and that allene is then secondarily isomerized to methyl acetylene. This theory has been experimentarily verified.

The theory suggests that, if the hydrogen-abstraction reaction is facilitated, allene and hence methyl acetylene will be produced more easily and at higher yields experiments. The present inventors then carried out under the various conditions adding into the reaction system the sources of radicals (catalysts) for promoting the hydrogen-abstraction reaction.

The results are shown in the accompanying figure in terms of the relation between yield and conversion. The figure shows that the yields attained by the addition of various catalysts to the reaction system are evidently greater than the yield obtained without any such additive.

For a better understanding thereof, the present invention is illustrated by the following example.

EXAMPLE

Material gas containing propylene, catalysts, (for example, oxygen, chlorine, bromine, diazomethane, allyl chloride, etc.) and nitrogen gas was pyrolyzed by passing it through a quartz tube (inside diameter: 3–5 mm., and the length of the portion to be heated to a desired temperature: 7 cm.) under normal pressure and at a temperature of 1000–1200° C. for a contact time of 0.1–0.001 second. The gas thus produced was analyzed by gas chromatography. Tables 1 through 4 show the results and control of experiments. Since allene is readily isomerized to methyl acetylene by heat treatment as above described, allene was regarded in the experiments as an equivalent to methyl acetylene and the yields of both were summed up in the tables.

The term "conversion" as used in the tables refers to the moles of cracked propylene per 100 moles of propylene supplied. Also the term "selectivity" means the moles of methyl acetylene and allene per 100 moles of cracked propylene. Furthur, "yield" means the moles of methyl acetylene and allene per 100 moles of propylene supplied.

Hence "yield" is expressed as a product of "conversion" and "selectivity."

As will be clearly understood from the foregoing description and example thereof, the present invention has the following advantageous features in its industrialization.

(1) Since the reaction can be effected under normal pressure, the apparatus can be economized accordingly.

(2) The starting material, propylene, is available in abundance.

(3) The catalysts according to the invention are more readily available than hydrogen bromide, and offer less problems in the materials of apparatus.

TABLE 1.—IN THE ABSENCE OF CATALYSER

| Material gas composition (mol percent): | | | | | | | | | | | | | | |
|---|---|---|---|---|---|---|---|---|---|---|---|---|---|---|
| Nitrogen | 84.9 | 86.8 | 85.4 | 86.6 | 86.9 | 85.8 | 87.3 | 87.2 | 87.2 | 84.4 | 85.2 | 87.1 | 86.6 | 87.0 |
| Propylene | 11.9 | 12.8 | 12.6 | 12.6 | 12.3 | 13.6 | 12.8 | 12.4 | 12.4 | 12.5 | 12.1 | 12.7 | 12.9 | 12.7 |
| Propane | 0.7 | 0.8 | 0.8 | 0.8 | 0.8 | 0.8 | 0.8 | 0.8 | 0.8 | 0.8 | 0.8 | 0.8 | 0.8 | 0.8 |
| Total percent | 97.5 | 100.4 | 98.8 | 100.0 | 100.0 | 100.2 | 100.9 | 100.4 | 100.4 | 97.7 | 98.1 | 100.6 | 100.2 | 100.5 |
| Reaction condition: | | | | | | | | | | | | | | |
| Temperature (° C.) | 1,050 | 1,050 | 1,050 | 1,150 | 1,150 | 1,150 | 1,150 | 1,200 | 1,200 | 1,200 | 1,200 | 1,200 | 1,300 | 1,300 |
| Contact time (10⁻³ sec.) | 5.48 | 7.93 | 11.0 | 3.54 | 3.70 | 4.99 | 6.81 | 3.16 | 3.57 | 2.44 | 3.66 | 3.11 | 1.46 | 1.72 |
| Conversion | 21.1 | 45.2 | 63.4 | 16.4 | 17.1 | 43.6 | 67.3 | 16.5 | 29.6 | 38.2 | 54.6 | 56.7 | 31.0 | 45.2 |
| Selectivity: | | | | | | | | | | | | | | |
| Allene and methyl acetylene | 25.4 | 19.9 | 17.0 | 24.0 | 23.5 | 20.3 | 17.4 | 25.9 | 24.1 | 24.4 | 21.3 | 20.2 | 23.6 | 20.2 |
| Allene | 14.5 | 9.2 | 6.6 | 14.4 | 13.4 | 9.4 | 6.7 | 14.6 | 11.7 | 11.6 | 9.1 | 8.6 | 11.2 | 9.0 |
| Methyl acetylene | 10.9 | 10.7 | 10.4 | 9.6 | 10.1 | 10.9 | 10.7 | 11.3 | 12.4 | 12.8 | 12.2 | 11.6 | 11.4 | 11.2 |
| Hydrogen | 19.4 | 18.2 | 22.5 | 21.1 | 19.1 | 19.5 | 26.4 | 22.9 | 26.0 | 25.0 | 25.8 | 24.8 | 26.2 | 29.2 |
| Methane | 40.6 | 42.4 | 46.6 | 43.4 | 40.8 | 36.8 | 46.2 | 36.2 | 44.6 | 42.4 | 44.6 | 43.3 | 28.8 | 41.8 |
| Acetylene | 5.7 | 6.9 | 9.4 | 7.2 | 7.6 | 8.3 | 13.9 | 7.2 | 12.1 | 11.0 | 12.7 | 12.0 | 12.8 | 14.8 |
| Ethylene | 46.3 | 41.8 | 41.6 | 51.6 | 47.4 | 41.0 | 45.2 | 47.8 | 48.6 | 46.7 | 44.0 | 42.5 | 43.0 | 41.6 |
| Ethane | 2.2 | 1.9 | 1.6 | 2.7 | 2.6 | 2.1 | 1.7 | 3.2 | 2.5 | 2.5 | 2.3 | 2.0 | 2.7 | 2.2 |
| Butene-1 | 6.4 | 2.0 | 0.8 | 4.1 | 6.9 | 2.2 | 0.4 | 7.1 | 2.5 | 2.3 | 1.0 | 1.1 | 2.1 | 1.4 |
| Butadiene | 4.1 | 3.2 | 2.9 | 3.1 | 4.9 | 3.0 | 2.6 | 3.7 | 3.5 | 3.0 | 2.9 | 2.7 | 2.9 | 2.5 |
| Yield (mol): | | | | | | | | | | | | | | |
| Produced $C_3H_4$/Supplied $C_3H_6$ | 5.6 | 9.0 | 10.7 | 3.9 | 4.0 | 8.9 | 11.7 | 4.0 | 7.1 | 9.3 | 11.7 | 11.5 | 7.3 | 9.1 |

TABLE 2.—IN THE PRESENCE OF OXYGEN

| Material gas composition (mol percent): | | | | | | | |
|---|---|---|---|---|---|---|---|
| Nitrogen | 83.0 | 86.9 | 81.9 | 85.0 | 85.5 | 85.2 | 84.9 |
| Propylene | 11.6 | 9.9 | 12.1 | 13.0 | 12.2 | 12.4 | 13.2 |
| Propane | 0.7 | 0.6 | 0.8 | 0.8 | 0.8 | 0.8 | 0.8 |
| Oxygen | 1.4 | 1.9 | 1.2 | 1.2 | 1.6 | 1.6 | 1.1 |
| Total percent | 96.7 | 99.3 | 96.0 | 100.0 | 100.1 | 100.0 | 100.0 |
| Reaction condition: | | | | | | | |
| Temperature (° C.) | 1,050 | 1,050 | 1,050 | 1,150 | 1,150 | 1,150 | 1,200 |
| Contact time (10⁻³ sec.) | 4.73 | 8.11 | 9.45 | 2.20 | 3.51 | 6.15 | 2.06 |
| Conversion | 19.2 | 38.8 | 64.0 | 21.7 | 28.5 | 62.6 | 39.7 |
| Selectivity: | | | | | | | |
| Allene and methyl acetylene | 25.8 | 25.2 | 18.2 | 26.1 | 24.4 | 17.0 | 22.9 |
| Allene | 15.2 | 12.1 | 7.1 | 14.2 | 12.0 | 7.0 | 10.8 |
| Methyl acetylene | 10.6 | 13.1 | 11.1 | 11.9 | 12.4 | 10.0 | 12.1 |
| Hydrogen | 17.6 | 24.1 | 26.4 | 19.4 | 24.5 | 25.7 | 23.8 |
| Methane | 40.0 | 48.4 | 47.9 | 42.4 | 41.4 | 44.7 | 43.3 |
| Acetylene | 5.9 | 8.5 | 11.6 | 8.5 | 9.0 | 12.0 | 10.1 |
| Ethylene | 50.5 | 52.0 | 48.6 | 50.2 | 48.0 | 44.2 | 47.0 |
| Ethane | 2.6 | 2.7 | 2.0 | 2.9 | 2.6 | 2.0 | 2.8 |
| Butene-1 | 7.0 | 2.9 | 0.8 | 5.2 | 3.3 | 0.9 | 2.1 |
| Butadiene | 3.9 | 3.6 | 3.1 | 3.4 | 3.7 | 2.6 | 3.0 |
| Yield (mol): | | | | | | | |
| Produced $C_3H_4$/Supplied $C_3H_6$ | 5.0 | 9.8 | 11.7 | 5.7 | 7.0 | 10.7 | 9.1 |

TABLE 3.—IN THE PRESENCE OF ALLYLCHLORIDE

| Material gas composition (mol percent): | | | | | | | | | | | |
|---|---|---|---|---|---|---|---|---|---|---|---|
| Nitrogen | 85.3 | 85.3 | 86.6 | 85.5 | 89.0 | 85.5 | 86.0 | 85.7 | 86.5 | 85.9 | 83.9 |
| Propylene | 13.0 | 13.0 | 13.2 | 12.8 | 12.5 | 13.2 | 12.6 | 12.7 | 13.6 | 11.6 | 13.0 |
| Propane | 0.9 | 0.9 | 0.8 | 0.8 | 0.8 | 0.8 | 0.8 | 0.8 | 0.8 | 0.7 | 0.8 |
| Allylchloride | 1.4 | 1.4 | 0.1 | 0.3 | 0.3 | 0.6 | 0.6 | 0.6 | 0.9 | 1.4 | 1.4 |
| Total percent | 100.6 | 100.6 | 100.7 | 99.4 | 102.6 | 99.1 | 100.0 | 99.8 | 101.8 | 99.6 | 100.1 |
| Reaction condition: | | | | | | | | | | | |
| Temperature (°C.) | 950 | 950 | 1,050 | 1,050 | 1,050 | 1,050 | 1,050 | 1,050 | 1,050 | 1,050 | 1,050 |
| Contact time ($10^{-3}$ sec.) | 1.01 | 2.58 | 4.28 | 5.54 | 6.10 | 4.24 | 4.90 | 5.54 | 5.19 | 5.31 | 6.85 |
| Conversion | 25.5 | 42.0 | 10.9 | 19.2 | 25.0 | 19.1 | 33.0 | 41.8 | 27.0 | 25.0 | 37.3 |
| Selectivity: | | | | | | | | | | | |
| Allene and methyl acetylene | 22.5 | 18.2 | 30.0 | 29.4 | 28.9 | 26.4 | 26.4 | 21.9 | 27.3 | 25.8 | 22.1 |
| Allene | 13.2 | 8.4 | 18.9 | 16.9 | 15.4 | 16.0 | 13.8 | 10.8 | 15.5 | 15.2 | 11.4 |
| Methyl acetylene | 9.3 | 9.8 | 11.1 | 12.5 | 13.5 | 10.4 | 12.6 | 11.1 | 11.8 | 10.6 | 10.7 |
| Hydrogen | 15.8 | 20.4 | 17.4 | 16.8 | 20.0 | 15.2 | 21.3 | 19.5 | 15.5 | 16.7 | 19.2 |
| Methane | 19.5 | 37.8 | 33.5 | 35.2 | 44.2 | 33.7 | 41.8 | 37.8 | 26.8 | 22.4 | 29.6 |
| Acetylene | 7.4 | 6.9 | 5.4 | 6.3 | 7.4 | 5.0 | 8.0 | 7.4 | 11.6 | 9.3 | 6.3 |
| Ethylene | 35.1 | 41.1 | 45.0 | 45.2 | 48.5 | 43.4 | 46.4 | 40.8 | 38.9 | 36.5 | 36.6 |
| Ethane | 0.7 | 0.7 | 2.1 | 1.8 | 1.9 | 1.8 | 1.5 | 1.5 | 0.8 | 0.9 | 0.8 |
| Butene-1 | 10.4 | 2.1 | 10.3 | 7.7 | 5.0 | 7.3 | 3.7 | 2.4 | 7.1 | 9.6 | 4.1 |
| Butadiene | 8.0 | 6.2 | 2.0 | 3.9 | 4.0 | 3.7 | 3.8 | 3.4 | 6.7 | 6.3 | 4.6 |
| Yield (mol): | | | | | | | | | | | |
| Produced $C_3H_4$/Supplied $C_3H_6$ | 5.7 | 7.7 | 3.3 | 5.6 | 7.2 | 5.0 | 8.7 | 9.2 | 7.3 | 6.4 | 8.2 |

Since allylchloride was converted into allene and methylacetylene in these experiments, it was calculated as a material gas.

| Material gas composition (mol percent): | | | | | | | | | | |
|---|---|---|---|---|---|---|---|---|---|---|
| Nitrogen | 85.0 | 85.0 | 85.8 | 85.8 | 84.8 | 84.0 | 84.0 | 84.6 | 84.1 | 85.2 |
| Propylene | 13.4 | 13.4 | 13.8 | 13.8 | 12.6 | 12.6 | 12.9 | 12.4 | 12.5 | 12.8 |
| Propane | 0.8 | 0.8 | 0.8 | 0.8 | 0.8 | 0.8 | 0.8 | 0.8 | 0.8 | 0.8 |
| Allylchloride | 1.5 | 1.5 | 1.6 | 1.6 | 1.8 | 1.8 | 2.1 | 0.7 | 1.6 | 1.0 |
| Total percent | 100.7 | 100.7 | 101.0 | 101.0 | 100.0 | 99.2 | 99.8 | 98.5 | 99.0 | 99.9 |
| Reaction condition: | | | | | | | | | | |
| Temperature (°C.) | 1,050 | 1,050 | 1,050 | 1,050 | 1,050 | 1,050 | 1,050 | 1,150 | 1,150 | 1,150 |
| Contact time ($10^{-3}$ sec.) | 6.05 | 5.86 | 5.49 | 4.67 | 5.91 | 3.87 | 6.40 | 3.98 | 3.18 | 2.63 |
| Conversion | 33.0 | 35.8 | 33.0 | 36.4 | 36.5 | 14.7 | 42.5 | 41.2 | 31.2 | 33.9 |
| Selectivity: | | | | | | | | | | |
| Allene and methyl acetylene | 25.5 | 23.2 | 26.1 | 24.0 | 23.4 | 29.9 | 20.7 | 23.1 | 24.9 | 26.0 |
| Allene | 14.0 | 12.4 | 13.8 | 12.8 | 12.9 | 19.1 | 10.9 | 11.4 | 13.2 | 13.1 |
| Methyl acetylene | 11.5 | 10.8 | 12.3 | 11.2 | 10.5 | 10.8 | 9.8 | 11.7 | 11.7 | 12.9 |
| Hydrogen | 20.1 | 18.6 | 18.9 | 17.4 | 19.2 | 13.6 | 17.6 | 21.0 | 17.7 | 21.2 |
| Methane | 27.5 | 26.6 | 28.8 | 26.6 | 28.2 | 19.1 | 24.6 | 34.5 | 24.6 | 29.1 |
| Acetylene | 6.4 | 6.3 | 10.4 | 7.3 | 7.8 | 6.1 | 7.8 | 10.5 | 7.4 | 12.2 |
| Ethylene | 37.0 | 36.1 | 38.2 | 35.7 | 36.8 | 33.1 | 32.0 | 39.4 | 34.6 | 35.6 |
| Ethane | 0.7 | 0.9 | 0.8 | 0.7 | 0.7 | 1.3 | 0.6 | 1.4 | 1.0 | 1.4 |
| Butene-1 | 6.0 | 4.6 | 5.4 | 5.3 | 5.2 | 13.9 | 4.3 | 3.3 | 5.5 | 5.3 |
| Butadiene | 6.2 | 5.5 | 6.6 | 5.0 | 6.5 | 6.2 | 7.7 | 3.0 | 4.5 | 3.7 |
| Yield (mol): | | | | | | | | | | |
| Produced $C_3H_4$/Supplied $C_3H_6$ | 8.2 | 8.3 | 8.6 | 8.7 | 8.8 | 4.4 | 8.8 | 9.5 | 7.8 | 8.8 |

TABLE 4

| Catalyser | Chlorine | | | | | | | | |
|---|---|---|---|---|---|---|---|---|---|
| Material gas composition (mol percent): | | | | | | | | | |
| Nitrogen | 84.8 | 86.2 | 82.1 | 83.9 | 88.5 | 87.5 | 86.8 | 87.4 | 89.0 |
| Propylene | 12.6 | 10.6 | 12.7 | 12.6 | 12.2 | 12.1 | 12.8 | 13.5 | 13.9 |
| Propane | 0.8 | 0.7 | 0.8 | 0.8 | 0.8 | 0.7 | 0.8 | 0.8 | 0.9 |
| Catalyser | 0.5 | 0.3 | 0.7 | 1.4 | 0.6 | 0.8 | 0.9 | 0.6 | 0.7 |
| Total percent | 98.7 | 97.8 | 96.3 | 98.7 | 102.1 | 101.1 | 101.3 | 101.3 | 104.5 |
| Reaction condition: | | | | | | | | | |
| Temperature (°C.) | 1,050 | 1,050 | 1,050 | 1,050 | 1,150 | 1,150 | 1,150 | 1,200 | 1,200 |
| Contact time ($10^{-3}$ sec.) | 4.84 | 4.62 | 7.50 | 7.64 | 2.46 | 2.98 | 3.56 | 1.60 | 2.32 |
| Conversion | 18.2 | 20.4 | 47.6 | 53.1 | 20.3 | 32.6 | 46.8 | 13.5 | 31.4 |
| Selectivity: | | | | | | | | | |
| Allene and methyl acetylene | 28.7 | 27.4 | 20.9 | 20.2 | 31.8 | 29.1 | 25.5 | 33.6 | 26.5 |
| Allene | 16.7 | 15.9 | 9.3 | 8.6 | 17.4 | 14.3 | 11.2 | 18.7 | 13.0 |
| Methyl acetylene | 12.0 | 11.5 | 11.6 | 11.6 | 14.4 | 14.8 | 14.3 | 14.9 | 13.5 |
| Hydrogen | 22.2 | 22.2 | 22.8 | 22.2 | 22.3 | 25.8 | 26.9 | 21.8 | 22.4 |
| Methane | 42.8 | 40.8 | 40.6 | 36.6 | 30.4 | 33.6 | 36.6 | 21.4 | 28.6 |
| Acetylene | 6.2 | 5.8 | 8.0 | 8.4 | 8.4 | 9.7 | 11.0 | 8.9 | 9.8 |
| Ethylene | 50.7 | 49.0 | 43.8 | 37.6 | 45.6 | 44.2 | 42.0 | 46.2 | 41.0 |
| Ethane | 2.2 | 2.1 | 1.7 | 0.8 | 2.1 | 1.7 | 1.4 | 2.7 | 1.8 |
| Butene-1 | 6.6 | 6.3 | 1.8 | 1.0 | 5.5 | 3.4 | 1.9 | 6.9 | 3.2 |
| Butadiene | 3.9 | 3.9 | 3.2 | 2.5 | 3.5 | 3.2 | 2.9 | 3.2 | 3.2 |
| Yield (mol): | | | | | | | | | |
| Produced $C_3H_4$/Supplied $C_3H_6$ | 5.2 | 5.6 | 10.0 | 10.7 | 6.5 | 9.5 | 11.9 | 4.5 | 8.4 |
| Catalyser | Diazomethane | | | | | Bromine | | | |
| Material gas composition (mol percent): | | | | | | | | | |
| Nitrogen | 85.2 | 85.0 | 84.2 | 86.1 | 87.1 | 85.7 | 86.0 | 86.3 | 84.8 |
| Propylene | 11.6 | 11.5 | 11.5 | 13.2 | 13.9 | 12.1 | 12.2 | 11.6 | 11.1 |
| Propane | 0.7 | 0.7 | 0.7 | 0.8 | 0.8 | 0.8 | 0.8 | 0.8 | 0.7 |
| Catalyser | 0.4 | 0.4 | 0.5 | 0.4 | 0.4 | 0.8 | 0.9 | 1K0 | 1.2 |
| Total percent | 97.9 | 97.6 | 96.9 | 100.5 | 102.2 | 99.4 | 99.9 | 99.7 | 97.8 |
| Reaction condition: | | | | | | | | | |
| Temperature (°C.) | 1,150 | 1,150 | 1,150 | 1,150 | 1,150 | 1,150 | 1,150 | 1,150 | 1,150 |
| Contact time ($10^{-3}$ sec.) | 1.64 | 1.71 | 1.91 | 2.82 | 2.46 | 2.96 | 3.52 | 3.60 | 5.76 |
| Conversion | 26.9 | 30.4 | 34.8 | 38.2 | 38.4 | 29.8 | 36.6 | 38.8 | 68.6 |

TABLE 4—Continued

| Selectivity: | | | | | | | | | |
|---|---|---|---|---|---|---|---|---|---|
| Allene and methyl acetylene | 28.5 | 26.4 | 26.2 | 27.5 | 26.4 | 29.1 | 28.7 | 30.2 | 23.0 |
| Allene | 15.1 | 13.6 | 13.1 | 12.7 | 12.1 | 13.8 | 12.6 | 12.8 | 8.5 |
| Methyl acetylene | 13.4 | 12.8 | 13.1 | 14.8 | 14.3 | 15.3 | 16.1 | 17.4 | 14.5 |
| Hydrogen | 24.8 | 23.7 | 24.8 | 24.2 | 23.8 | 29.3 | 32.2 | 34.6 | 42.7 |
| Methane | 40.8 | 39.6 | 39.1 | 37.8 | 37.4 | 46.8 | 49.1 | 49.4 | 57.0 |
| Acetylene | 8.5 | 8.3 | 8.6 | 10.7 | 10.4 | 8.8 | 9.4 | 10.2 | 13.7 |
| Ethylene | 50.1 | 47.0 | 45.8 | 48.8 | 47.4 | 40.0 | 39.3 | 38.8 | 37.6 |
| Ethane | 2.6 | 2.6 | 2.7 | 2.32 | 2.3 | 1.1 | 0.8 | 0.9 | 0.5 |
| Butene-1 | 4.3 | 3.7 | 3.1 | 2.6 | 2.6 | 1.2 | 0.6 | 0.4 | 0.0 |
| Butadiene | 2.9 | 2.3 | 2.6 | 3.8 | 3.5 | 1.6 | 3.0 | 1.5 | 0.1 |
| Yield (mol): | | | | | | | | | |
| Produced $C_3H_4$/Supplied $C_3H_6$ | 7.7 | 8.0 | 9.1 | 10.5 | 10.1 | 8.7 | 10.5 | 9.6 | 15.8 |

We claim:

1. In the method of producing methyl acetylene and allene by the pyrolysis of propylene the improvement comprising conducting said pyrolysis at a temperature of at least 950° C. in the presence of a catalyst consisting essentially of a member of the group consisting of oxygen, diazomethane, allyl chloride and mixtures thereof.

2. A method according to claim 1 wherein said catalyst is selected from the group consisting of diazomethane, allyl chloride and mixtures thereof.

3. A method according to claim 2 wherein the pyrolysis is conducted at a temperature in the range 1000°–1200° C.

4. A method according to claim 2 wherein the catalyst is present in a ratio of 1 mol catalyst to from 5.2 to 13.2 mols of propylene.

5. A method of producing methyl acetylene and allene as defined in claim 1 wherein the pyrolysis is effected under or around normal pressure.

6. A method according to claim 1 wherein the catalyst consists essentially of oxygen.

7. A method according to claim 6 wherein the pyrolysis is conducted at a temperature in the range 1000°–1200° C.

8. A method according to claim 6 wherein the catalyst is present in a ratio of 1 mol catalyst to from 5.2 to 13.2 mols of propylene.

References Cited

UNITED STATES PATENTS

| 2,966,525 | 12/1960 | Steen | 260—654 |
| 3,082,273 | 3/1963 | Peer et al. | 260—678 |
| 3,207,806 | 9/1965 | Bajars | 260—680 |
| 3,315,004 | 4/1967 | Happel et al. | 260—678 |

OTHER REFERENCES

DELBERT E. GANTZ, *Primary Examiner.*

J. D. MYERS, *Assistant Examiner.*

U.S. Cl. X.R.

260—680